United States Patent [19]

Ikeda et al.

[11] Patent Number: 5,168,442

[45] Date of Patent: Dec. 1, 1992

[54] PROGRAMMABLE CONTROLLER WITH MODIFIABLE LADDER PROGRAM

[75] Inventors: Yoshiaki Ikeda, Oshino; Mitsuru Kuwasawa, Gotenba, both of Japan

[73] Assignee: Fanuc Ltd., Minamitsuru, Japan

[21] Appl. No.: 460,100

[22] PCT Filed: Jun. 19, 1989

[86] PCT No.: PCT/JP89/00610

§ 371 Date: Feb. 9, 1990

§ 102(e) Date: Feb. 9, 1990

[87] PCT Pub. No.: WO90/00763

PCT Pub. Date: Jan. 25, 1990

[30] Foreign Application Priority Data

Jul. 8, 1988 [JP] Japan .................. 63-170450

[51] Int. Cl.⁵ ............................................. G06F 15/46
[52] U.S. Cl. ........................... 364/147; 364/DIG. 2; 364/926.9; 364/949; 364/965.76
[58] Field of Search ............................. 364/140-147, 364/200 MS File, 900 MS File, 136, 188, 189; 395/275, 425

[56] References Cited

U.S. PATENT DOCUMENTS 4,566,061 1/1986 Ogden et al. ............ 364/181 X
4,638,452 1/1987 Schultz et al. ............ 364/900
4,677,541 6/1987 Singhi ........................ 364/145
4,916,640 4/1990 Gasperi et al. ............ 382/48 X

FOREIGN PATENT DOCUMENTS 58-200346 11/1983 Japan .
59-149509 8/1984 Japan .
61-7962 1/1986 Japan .

*Primary Examiner*—Joseph Ruggiero
*Attorney, Agent, or Firm*—Staas & Halsey

[57] ABSTRACT

A programmable controller according to the present invention is for reinforcing the function of a programmable machine controller (PMC) of a numerical control unit (CNC) incorporating a minicomputer. In order to achieve high-speed processing of a PMC ladder program which implements auxiliary control functions for machining inclusive of tool-change control, control of the rotational speed of a spindle and workpiece-change control, the programmable controller is provided with an electrically rewritable programmable read-only memory (EEPROM) (6), and a random-access memory (RAM) (7) to which program data is transferred from the EEPROM (6), and the arrangement is such that the contents of the EEPROM (6) are rewritten before the data transfer.

2 Claims, 1 Drawing Sheet

PROGRAMMABLE CONTROLLER WITH MODIFIABLE LADDER PROGRAM

TECHNICAL FIELD

This invention relates to a programmable controller in which sequence control of a machine tool is executed by ladder processing which employs a microprocessor or the like. More particularly, the invention makes it possible to modify a ladder program and makes high-speed ladder processing feasible.

BACKGROUND ART

An ordinary programmable controller uses non-volatile memory means such as a ROM storing a specific ladder program in order to make possible sequence control conforming to a controlled system. If the controlled system of the programmable controller is a machine tool, it is required to create a ladder program in such a manner that it will not be necessary to change the existing ROM whenever there is a modification in a specifications of the machine tool. One method of achieving this is to make the portion of the ladder capable of being modified as a subroutine, and storing the subroutine in a rewritable EROM (erasable read-only memory). In modifying a ladder or adding to a ladder, a plurality of ROM boards are prepared in advance and these are plugged into, say, a mother board of the programmable controller, thereby making it possible to modify or add to the contents of a ladder.

In comparison with a case in which the ladder program is stored in temporary storage-type memory means such as a RAM and backing up the RAM using a separate power supply, the above method of storing the ladder program using only a conventional ROM is advantageous in that erasure of the program due to a power supply abnormality or the like can be prevented in reliable fashion. Conversely, however, the speed at which the program data can be read out of the ROM is lower than with the RAM, and therefore the operating speed of the machine tool is restricted by the ladder processing speed.

Though a programmable controller has been considered in which joint use is made of an ultraviolet erasable-type EPROM (erasable and programmable ROM), all of the data stored in single units in such case is erased simultaneously when the data is rewritten, and therefore it is impossible to modify a portion of the ladder. Moreover, another disadvantage is that a ROM unit must be extracted from the mother board on account of this erasure. With conventional programmable controllers of this kind, many problems are encountered in terms of modifying the ladder program and operating an NC (numerical control unit) efficiently.

DISCLOSURE OF THE INVENTION

Accordingly, the present invention has been devised in order to solve the foregoing problems and its object is to provide a programmable controller in which a programmable ladder sequence is stored electrically in a rewritable EEPROM and an NC can be operated efficiently by making joint use of a RAM capable of high-speed processing.

In accordance with the present invention, there is provided a programmable controller capable of storing a ladder program and of modifying and editing the contents thereof, which includes programmable read-only memory (EEPROM), capable of being electrically rewritten, for storing the ladder program stored in the EEPROM, and a random-access memory (RAM) to which program data is transferred from the EEPROM when the ladder program is executed.

Accordingly, the programmable controller according to the present invention is such that if a management program and ladder program are stored on an EEPROM board on the maker side at the time of shipment, editing and modification of the ladder in the ROM can be carried out on the user side whenever necessary without battery backup.

BEST MODE FOR CARRYING OUT THE INVENTION

An embodiment of the present invention will now be described in detail with reference to the drawings.

Figure 2:
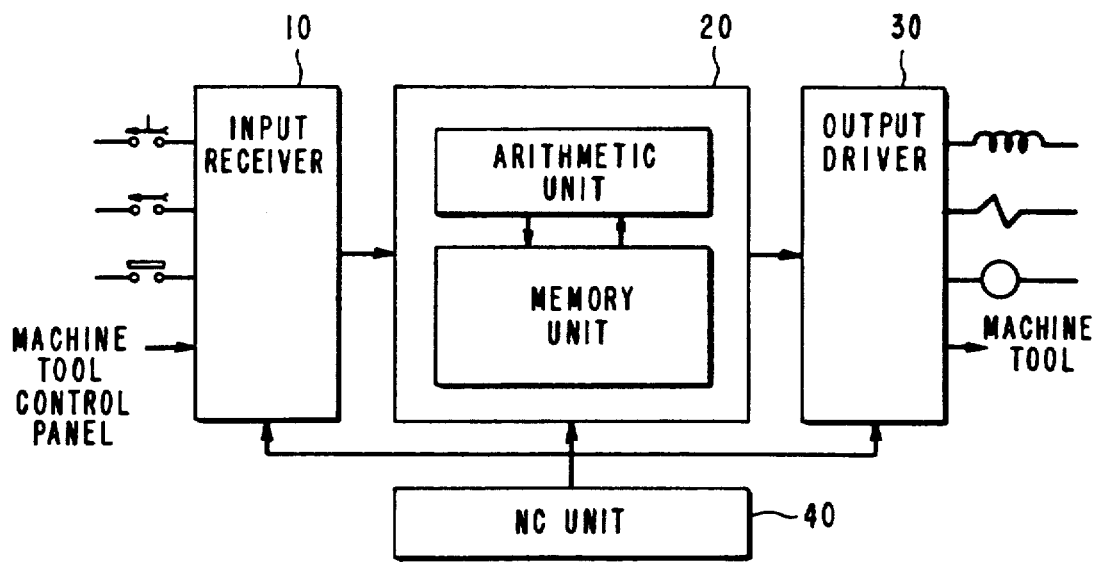
FIG. 2 is a block diagram illustrating the basic construction of a programmable controller.

FIG. 2 is a block diagram illustrating the basic construction of a sequence PC (programmable controller) used in conjunction with an NC unit which performs sequential control of a machine tool.

An input signal from a machine control panel, various external input devices such as a push button, a relay contact or a limit switch, are supplied to a PC main body 20 via an input receiver 10. The PC main body 20 is constituted by an arithmetic unit and a memory unit. The latter stores a ladder processing program edited in advance, as well as input/output information. A fixed, repetitive operation is performed by the arithmetic unit in accordance with the processing program, and an output signal from the PC main body 20 is applied, as the decoded result of a sequence, to a machine tool and various external output devices such as an electromagnetic switch, solenoid valve or display lamp via an output driver 30. The signal is also outputted as the state setting signal of an internal controller relay, and the signal is held in memory. The input receiver 10, PC main body 20 and output driver 30 are connected to an NC unit 40 and are capable of executing cyclic program processing corresponding to an ordinary ladder.

Figure 1:
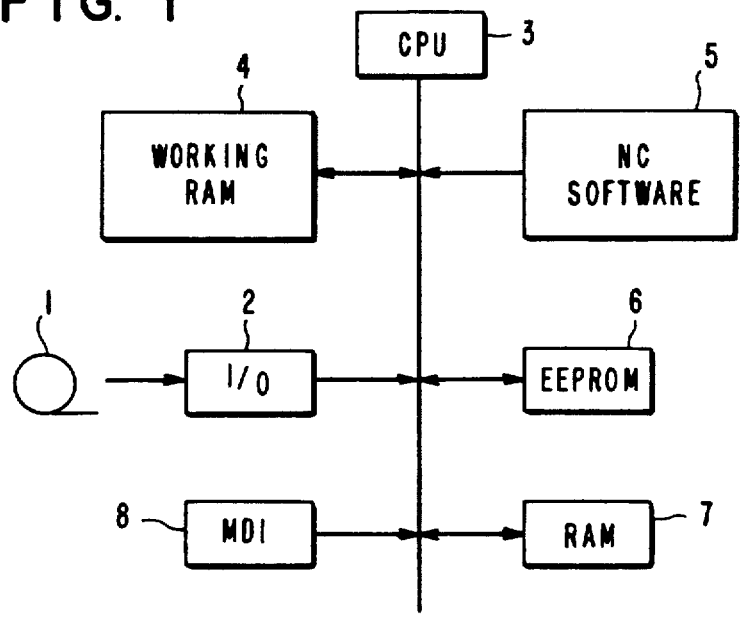
FIG. 1 is a block diagram illustrating an embodiment of the present invention.

FIG. 1 is a block diagram illustrating an example of a programmable sequence controller according to the present invention.

Numeral 1 denotes an NC tape on which the ladder program is recorded, and numeral 2 an input/output control unit for entering data read by a tape reader or the like. The input/output control unit 2 is connected to a bus of the CPU 3. Also connected to the bus is a manual data input 8 (MDI). Numeral 4 denotes a working RAM, and numeral 5 memory means for storing other necessary NC software.

Data read from the NC tape 1 is stored in a programmable read-only memory (EEPROM) 6 capable of being electrically rewritten. The EEPROM 6 is such that erasure of data in byte units is performed electrically. In other words, erasure is possible by applying a predetermined voltage to an erasure gate terminal to address the memory. Accordingly, editing, erasure and rewriting of a ladder program stored in the memory can be performed with facility. Since the speed at which the data is read is somewhat lower than that of an ordinary EPROM, NC operation is carried out upon transferring the data to a RAM 7.

Thus, a specific ladder program which makes possible sequence control conforming to a controlled system is stored in an electrically rewritable EEPROM 6, and ladder editing and debugging are carried out internally of the NC. Accordingly, program modification can be simply performed on the user side whenever necessary, thus making it possible to deal with changes in the specifications of a machine tool. In addition, data can be preserved more reliably in comparison with the prior art in which editing/storage performed in a CMOS-type RAM requires a power supply backup. Furthermore, since NC operation is executed after the data is transferred to the RAM 7, the speed at which the program data is read no longer places a restriction upon the speed at which a machine tool operates.

Though an embodiment of the present invention has been described, the invention is not limited to this embodiment but can be modified in various ways without departing from the scope of the claims.

INDUSTRIAL APPLICABILITY

The programmable controller of the present invention is such that a management program and ladder program are stored on an EEPROM board at the time of shipment, so that editing and modification of the ladder in the ROM can be carried out on the user side without battery backup. This makes high-speed processing of the ladder program possible.

We claim:

1. A programmable controller capable of storing a ladder program with control data for machining, and of modifying and editing the contents thereof, comprising:
   - a programmable read-only memory (EEPROM), which is capable of being electrically rewritten, for storing a part of said ladder program;
   - rewriting means for rewriting the part of said ladder program stored in the EEPROM responsive to a change in a specification of the machining, and
   - a random-access memory (RAM) to which program data is transferred from said EEPROM when said ladder program is executed in accordance with the change in the specification of the machining.

2. A programmable controller according to claim 1, characterized in that said rewriting means is a manual data input connected by a bus line to a CPU for ladder processing.

* * * * *

UNITED STATES PATENT AND TRADEMARK OFFICE
CERTIFICATE OF CORRECTION

PATENT NO. : 5,168,442
DATED : December 1, 1992
INVENTOR(S) : Ikeda et al.

It is certified that error appears in the above-identified patent and that said Letters Patent is hereby corrected as shown below:

- Column 2, line 1, after "program" insert --, rewriting means for rewriting the ladder program--.

Signed and Sealed this

Ninth Day of November, 1993

Attest:

*Attesting Officer*

BRUCE LEHMAN

*Commissioner of Patents and Trademarks*